United States Patent

Trost

[15] 3,663,763

[45] May 16, 1972

[54] AUTOMATIC TRACKING METHOD AND APPARATUS FOR ROTARY SCAN TAPE TRANSPORT

[72] Inventor: Allen J. Trost, Santa Clara, Calif.

[73] Assignee: Ampex Corporation, Redwood City, Calif.

[22] Filed: Apr. 6, 1970

[21] Appl. No.: 25,911

[52] U.S. Cl. ................179/100.2 T, 178/6.6 P, 179/100.2 S, 318/171

[51] Int. Cl. ....................................G11b 15/46, G11b 21/04

[58] Field of Search ..................179/100.2 S, 100.2, 100.2 T, 179/100.2 CA, 100.1 S; 178/6.6 P; 318/164, 171, 129; 340/174.1 C, 174.1 B, 174.1 D

[56] References Cited

UNITED STATES PATENTS

| | | | |
|---|---|---|---|
| 3,398,235 | 8/1968 | Baldwin et al. | 179/100.2 T |
| 3,126,535 | 3/1964 | Streeter | 340/174.1 C |
| 3,474,432 | 10/1969 | Sevilla | 340/174.1 B |
| 3,399,334 | 8/1968 | MacLeod | 318/171 |
| 3,097,267 | 7/1963 | Clark et al. | 178/6.6 P |

*Primary Examiner*—Stanley M. Urynowicz, Jr.
*Assistant Examiner*—Alfred H. Eddleman
*Attorney*—Robert G. Clay

[57] ABSTRACT

In order to provide automatic tracking during playback operation of a transverse scan tape transport, a low amplitude and low frequency signal is applied to the capstan drive in addition to the nominal playback drive signal such that the prerecorded transverse information tracks vacillate about an on-center tracking phase relationship with the rotary record/reproduce head wheel. The high frequency playback information signal from the rotary head wheel is thereby amplitude modulated in accordance with the varying tracking registration between the head wheel and transverse tracks. The amplitude modulation of the playback information signal is thereupon detected, and the frequency, phase and amplitude relationships between this detected signal and the signal employed for exciting the capstan drive are compared to provide a control signal for advancing or retarding the longitudinal tape movement until the transverse tracks and rotary head wheel are in optimum tracking phase relationship.

3 Claims, 9 Drawing Figures

Patented May 16, 1972 3,663,763

2 Sheets-Sheet 1

INVENTOR.
ALLEN J. TROST

Larry J. Jackson
ATTORNEY

INVENTOR.
ALLEN J. TROST

Larry [signature]
ATTORNEY

AUTOMATIC TRACKING METHOD AND APPARATUS FOR ROTARY SCAN TAPE TRANSPORT

The present invention generally relates to tape recording equipment and more particularly to playback tracking systems for wideband tape transports, such as for transverse or helical scan video recorders.

In order to record and reproduce the high frequency signals needed for storage and transmission of video information, present-day video tape transports take advantage of the high head to tape speed which can be developed by rapidly rotating the magnetic heads in a transverse or diagonal path relative to the longitudinal axis of the magnetic tape. The tape is still driven longitudinally, as in the case of conventional audio recorders, such that the rotating record/reproduce heads trace out a sequence of longitudinally spaced magnetic tracks, each at a substantial angle to the longitudinal access of the tape. In the case of a transverse scan transport, the magnetic tracks are substantially normal to the tape axis, being only slightly askew therefrom. The helical scan machines lay out magnetic tracks which extend diagonally across the width of the tape. In either case, during playback operation of the transport, the record/reproduce head must retrace the prerecorded tracks such that maximum signal strength can be derived from the magnetic record. Ideally then, the rotating head during playback should travel along an imaginary centerline lengthwise through each of the recorded tracks.

A common and highly advantageous method for obtaining the necessary tracking phase relationship between the rotating head and the prerecorded tape tracks is to record a longitudinal control track along with the recording of the video signal information. During playback, the control track from the tape is read and the resulting signal is employed for controlling the speed and angle of rotation of the rotary head wheel and capstan drive such that proper signal synchronization and tracking is achieved. However, there are usually physical changes in the spacing between the pick-up head used for reading the control track and the rotary head drum and changes in the physical integrity of the tape, e.g., stretching, which require manual adjustment during playback to bring the transverse or diagonal tracks back into an optimum tracking phase relationship with the rotating head drum wheel. The control track circuitry in conjunction with the capstan servo and drum head servo is usually adequate to maintain the proper absolute speed relationship between the longitudinal tape translation and the rotating head. However, changes in the spacing between the pick-up heads and distortion of the tape itself cause phase discrepancies between the tracks and head wheel which necessitate the manual adjustment. It will be apparent that video information can be wholly lost or at least partially attenuated each time a manual adjustment of the tracking is required. This can occur at the beginning of each tape or in some cases in the middle of a recorded video program.

Accordingly, it is an object of the present invention to provide a method and apparatus for automatically adjusting the phase relationship between longitudinal tape translation and rotation of the record/reproduce head such that optimum playback tracking is always provided.

It is a further object of the present invention to provide such an automatic tracking adjustment for a tape recorder system in which a relatively high frequency and wideband width signal has been recorded along tracks substantially transverse to the longitudinal tape axis and lower frequency signals have been recorded on tracks extending longitudinally with the tape.

Another object of the present invention is to provide substantial playback tracking in a transverse scan tape recorder even though there has been a failure to prerecord a control track signal.

These and other objects are achieved with the present invention by introducing a low frequency and low amplitude periodic perturbation in the longitudinal translation of the tape and detecting the frequency, amplitude and phase of the resulting amplitude modulated envelope of the high frequency, e.g., video, signal obtained from the rotating head during playback. The frequency, phase and amplitude of this detected signal, when compared with corresponding parameters of a signal used for causing the tape speed perturbations, provides a tracking error signal which is returned to the capstan drive of the tape transport for adjusting tape speed to achieve optimum tracking registration.

As described in more detail herein, the concept of the present invention as generalized above, has been successfully applied to a video tape recording/reproducing system in which video signals are recorded along tracks substantially transverse to the tape while lower frequency signals, such as the audio portion of the program, are recorded along tracks running longitudinally with the tape. In the case of the transverse video signal tracks, perturbations in the longitudinal speed of the tape have a negligible effect on this signal information during playback. However, playback of the audio information is directly dependent on the consistency of the tape speed, due to the audio track being recorded longitudinally with the tape. In accordance with the present invention, it has been found possible to select a tape speed disturb frequency just below the lower frequency limit of the audio band and thereby perform successfully the automatic tracking feature and maintain the playback audio signal at a high level of fidelity.

Further features and advantages of the invention will become apparent upon consideration of the following detailed description, which is to be taken in conjunction with the accompanying drawings, wherein:

FIG. 1 is a generalized block diagram illustrating the basic functions of the present invention in conjunction with cooperating components of a transverse scan of video tape transport;

FIGS. 2*a*, 2*b*, 2*c* and 2*d* are a series of graphs illustrating certain significant waveforms occurring in the circuitry of the present invention, wherein the waveforms are all drawn to a common time base;

Figure 1:
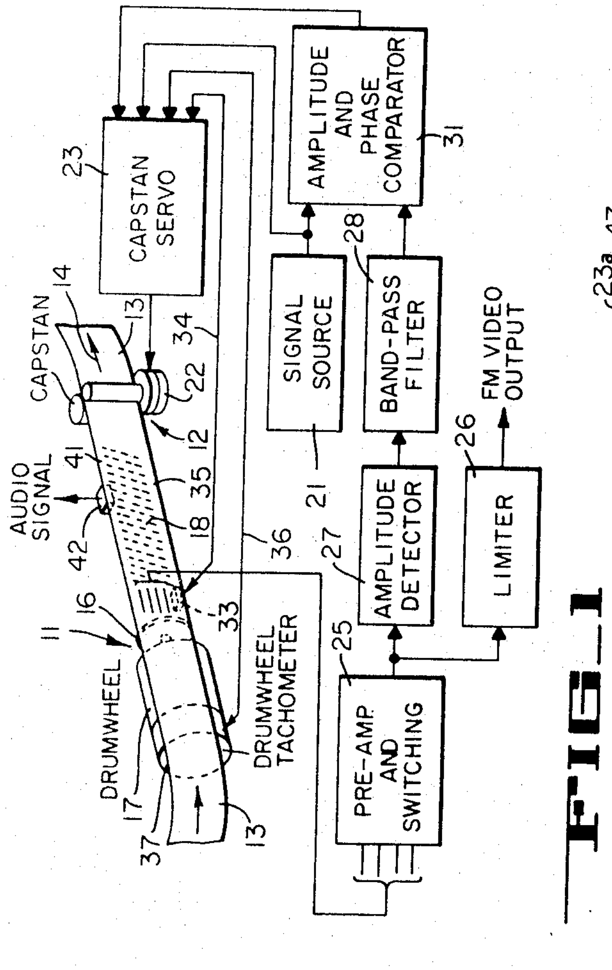

As generally illustrated in FIG. 1, the circuitry of the present invention is particularly adapted for operation in conjunction with a transverse scan video tape transport 11. Such transports are equipped with a capstan drive assembly 12 for longitudinal translation of magnetic recording tape 13, the translation in this instance being in a direction 14. For recording and playing back the wideband video information, four magnetic heads are employed and are here mounted on head drum wheel 16 which in turn is rotatably driven by a motor 17. The magnetic heads rotate with wheel 16 in a path precisely transverse to tape 13. However, due to the moderate translation speed of the tape in direction 14, head wheel 16 lays down magnetic tracks 18 which are slightly askew from the normal. During playback of tape 13, the respective magnetic heads of wheel 16 must retrace the magnetic tracks 18 in the same sequence as they were recorded.

To achieve this objective in a wholly automated fashion, the present invention comprises in general a low frequency signal source 21 which is applied to capstan motor 22 through a capstan servo 23 for periodically varying or disturbing the speed of tape 13. In effect, this causes tracks 18 to vacillate, in a longitudinal sense, from one side to the other of an on-center tracking registration with the magnetic heads of wheel 16. By this operation, the playback output from head wheel 16 is effectively amplitude modulated, the output signal increasing to a maximum when wheel 16 is in proper tracking phase with tracks 18 and decreasing to a minimum when the heads of wheel 16 are to one side or the other of the appropriate track. The signal information defined by this amplitude modulated waveform is used to develop and feedback an error signal for correcting any tracking mis-alignment.

In practice, the playback output from wheel 16 consists of four signals, one from each magnetic head, which must be combined in an ordered fashion to derive a single, continuous video signal. In FIG. 1, this combining operation is performed together with preamplification of the head signals by a preamplification and switching circuit 25. As the video signal is conventionally recorded in a frequency modulated form, the output of circuit 25 during playback is a frequency modulated signal carrying the video information, wherein such signal is also amplitude modulated as described above. At this point, the video signal, in its frequency modulated form, can be reclaimed through a limiter circuit 26 which eliminates the amplitude modulation and passes a clean frequency modulated signal to its output for further processing not significant in regard to the present invention. The output of preamplification and switching circuit 25 is also fed to an amplitude detector 27 which extracts a signal representing the envelope of the amplitude modulated output from head wheel 16. The average frequency of the FM video signal is so very much higher than the frequency selected for signal source 21, as more fully discussed herein, that amplitude detection is readily achieved by conventional circuit means.

The demodulated signal output from detector 27 is fed through a bandpass filter 28, having a bandpass centered at the frequency selected for signal source 21. By this operation, components of the output signal from detector 27 having a frequency twice that of source 21 are blocked by filter 28. In accordance with the operation of the illustrated embodiment of the invention, this filtering feature serves a very important function as more fully discussed herein. Frequencies below that of source 21 are also blocked by filter 28, such that the control loop path is unresponsive to DC drift and other substantially DC effects.

Amplitude and phase comparator 31 is disposed to receive the outputs of signal source 21 and bandpass filter 28 to provide an output error signal on line 32 representing the amount of tracking error and the direction in which tape 13 must be moved (to advance or retard) in order to obtain proper tracking. Particularly, comparator 31 is sensitive to changes in relative amplitude between signal source 21 and the envelope signal passed by filter 28 to provide a measure of any tracking error. Additionally, comparator 31 senses whether the signal from source 21 and the signal passed by filter 28 are in phase or 180° out of phase, thereby indicating whether tape 13 must be advanced or retarded in translation speed in order to correct the tracking error. Thus, comparator 31 provides both amplitude and direction information as to the nature of the tracking error. Such information is conveniently conveyed by a signal on line 32 having an amplitude representing the amount of tracking error and a polarity representing the direction in which the error occurs. Line 32 is extended to capstan servo 23 for passing the error signal from comparator 31 to and for correcting the instantaneous rotation of capstan motor 22 and consequently the translation of tape 13.

Usually, in the case of a video tape transport, stable tracking will also be facilitated by a control track 35, carrying a signal recorded along with the video information and played back by means of a control track head 33. This control track signal is fed over a line 34 to capstan servo 23. Servo 23 also receives a tachometer signal via a line 36 from a drum wheel tachometer 37 representing the rotational speed and angular position of head wheel 16. These two signals, i.e., from the control track and drum wheel tachometer, are phase compared within servo 23 to provide for synchronizing the rotation of head wheel 16 and the speed of tape 13. While it might be expected that these two signals in conjunction with capstan servo 23 would be sufficient to provide for continuous optimum tracking during playback, such is not the case. As noted above, proper tracking in the past has required periodic manual adjustment to compensate for variations in the spacing between head wheel 16 and control track head 33 and for changes in the physical dimensions of the tape itself. Stretching and other tape distortions caused by variations in temperature, humidity, etc., also have heretofore disallowed precise tracking during playback of a tape recorded at some earlier time.

The amplitude modulation effect of the high frequency FM video playback signal, as described above, is best illustrated with reference to FIGS. *2a–2d*. FIG. *2a* is a graph of one full cycle of the output signal from source 21. FIGS. *2b–2d* show various signal waveforms from the output of preamplification and switching circuit 25, which issues the processed playback signals from head wheel 16. The lower frequency modulation envelope shown in these figures is directly responsive to the vacillation of the transverse magnetic tracks into and out of exact registration with head wheel 16. The higher frequency signal bounded by each of the envelopes in FIGS. *2b–2d* is the FM video playback signal. FIG. *2b* represents an output signal from circuit 25 in which head wheel 16 and tape 13 are on track and the variation in tape translation caused by source 21 causes tracks 18 to be displaced in equal amounts on either side of proper tracking phase relation with wheel 16. Thus, maximum peak-to-peak values of the signal envelope occur when tape 13 is moved through tracking center, while points of minimum peak-to-peak amplitude on the signal occur when the center of the magnetic track is advanced or retarded relative to proper phase synchronization with wheel 16. Note that in FIG. 2 *b* the frequency of the envelope is twice that of the signal from source 21 as shown in FIG. *2a*. Thus, when proper and optimum tracking exists, the signal output from detector 27 has twice the frequency of that of source 21 and consequently the entire signal output from the detector is blocked by bandpass filter 28 and no error signal is delivered by comparator 31 to line 32.

Figures 2A, 2B, 2C, 2D:
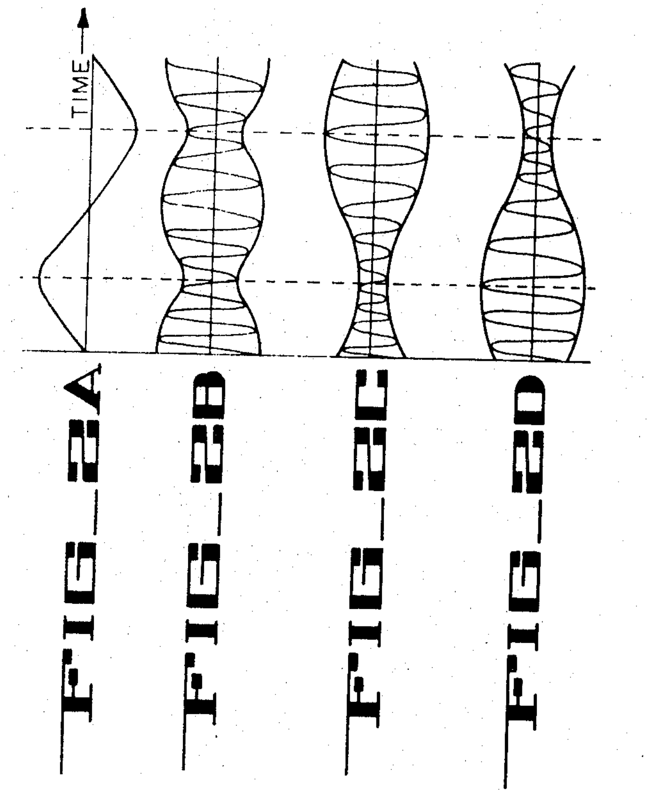

On the other hand, when there is a tracking error, the output signal from circuit 25 will appear as shown in either FIG. *2c* or FIG. 2d, depending upon the direction in which the tracking error occurs. For example, assume that there is a tracking error in which the translation of tape 13 is slightly advanced relative to the phase of rotation of drum wheel 16. As a result, the maximum peak-to-peak value of the envelope signal occurs only once every full cycle of the source frequency as shown by FIG. *2c*, thus indicating the presence of a substantial component of the signal source frequency in the output of circuit 25. This component of the envelope, after detection by detector 27 and passage through filter 28, is compared with the signal from source 21 to derive an error signal having an amplitude related to the amount of tracking error. Furthermore, as shown by a comparison of FIGS. *2c* and *2d*, the direction in which the tracking error occurs shows up in the phase relationship between the envelope signal and the signal from source 21. Thus the phase of the signal received by comparator 31 from filter 28, with respect to the phase of signal source 21 determines the polarity of the error signal on line 32. The polarity of the error signal in turn directs capstan servo 23 to either advance or retard the speed of tape 13.

In addition to the video information carried by transverse tracks 18, video tape 13 is provided with an audio track 41 positioned to be played back by audio reproduce head 42. As the audio signal has a relatively low frequency range and is recorded longitudinally on tape 13, care must be exercised in selecting the amplitude and frequency of the capstan disturb signal so as to avoid a intolerable increase in audio flutter during playback. In regard to the amplitude of the disturb signal, this requirement is best met by adjusting source 21 such that the peak-to-peak change in phase relationship between tracks 18 and the heads of wheel 16 is on the same order of magnitude as the width of transverse tracks 18. The width of each of tracks 18 is typically on the order of 0.010 inches, and thus it will be appreciated that the phase or speed change of the capstan drive 12 in response to the disturb signal from source 21 is extremely small. Preferably, the frequency of the disturb signal is selected to lie just below the lower frequency limit of the audio bandwidth. A frequency in the range from 5 to 20 cycles per second is suitable, and a frequency of around 10 to 12 cycles per second has been found most satisfactory. Frequencies below these values impose too long a time period for tracking lock-up to occur, while higher frequencies would enter the audio bandwidth and adversely affect audio playback performance.

Figure 4:
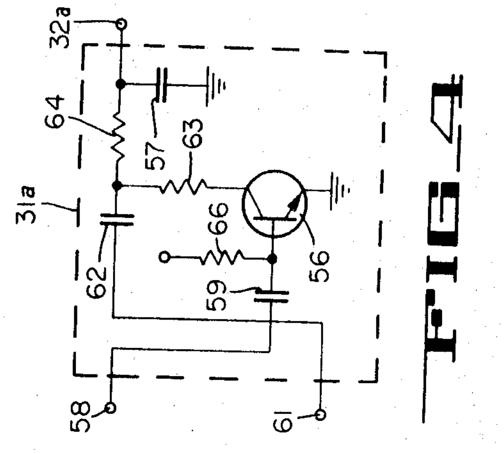
FIG. 4 is a schematic diagram showing in detail one of the component blocks of the FIG. 3 circuit diagram.
Figure 3:
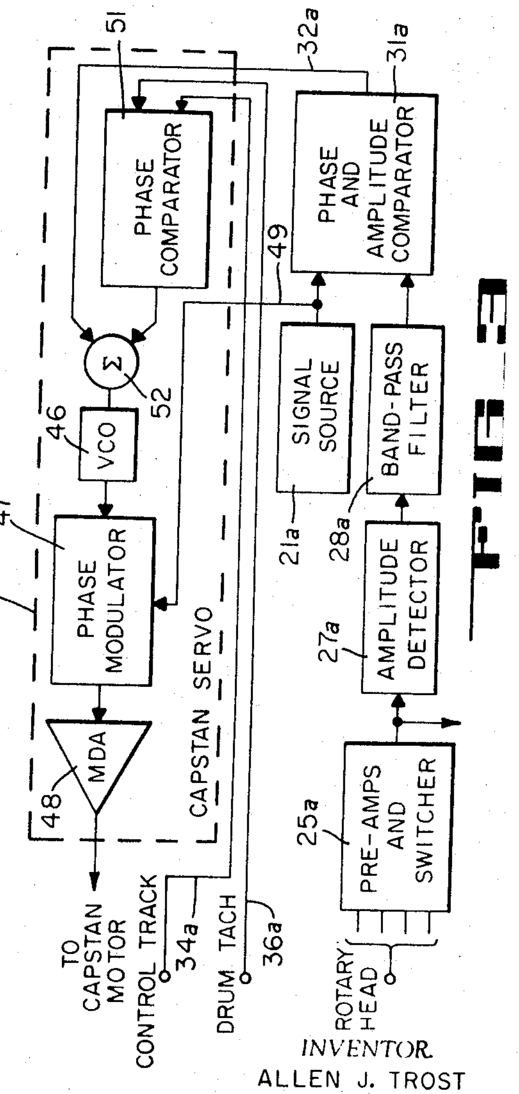
FIG. 3 is a generalized block diagram illustrating one circuit embodiment operating in accordance with the principles of the present invention.

One preferred embodiment of the automatic tracking control circuitry is illustrated in some detail in FIGS. 3 and 4. Therein, components having corresponding counterparts in FIG. 1 are denoted by the same reference number with the postscript "*a*". With particular reference to FIG. 3, capstan servo 23*a* drives capstan motor 22 with a signal having frequency and phase characteristics determined by a voltage controlled oscillator 46 and a phase modulator 47, respectively. A motor drive amplifier 48 receives the output signal from phase modulator 47 and merely power amplifies such signal without changing the phase or frequency thereof. The capstan motor in this instance is adapted to respond to the frequency and phase of the output signal from servo 23*a* and provide the proper speed and angle of rotation for the capstan. Typically, this is a two phase motor control system.

Phase modulator 47 is responsive to signal source 21*a* over a line 49 to vary the phase relationship of the motor drive signal such that the capstan motor is driven at a periodically varying speed and thus provides the desired perturbation of the tape translation. Voltage controlled oscillator 46 is responsive to a phase comparison between the control track signal and drum tachometer signal received over lines 34*a* and 36*a* to adjust the frequency of the motor drive signals to bring the capstan into a proper speed relationship with respect to the drum head wheel 16. Thus, a phase comparator 51 receives both the control track signal and drum tachometer signal and issues an error signal to a summing junction 52 for adjusting oscillator 46. Summing junction 52 also receives an output error signal from comparator 31*a* via line 32*a* for correcting tracking errors.

It will be appreciated that significant tracking control can be obtained with the present invention, even in the absence of a control track signal and/or drum tachometer signal. For example, assuming that by mistake or purpose there was a failure to record a control track signal along with the video information. In such case, the present invention makes it possible to drive capstan assmebly 12 at a nominal or predetermined average rate and thereupon utilize only the phase error signal from line 32*a* for maintaining continuous tracking.

While numerous circuits can be employed for comparator 31*a*, one simple circuit is illustrated by FIG. 4. Therein, a transistor 56 is periodically switched on and off by signal source 21*a* in a manner such that a capacitor 57 assumes an average charge potential indicating the amplitude of the tracking error and a polarity indicating the direction in which the tracking error occurs. Particularly, the output of signal source 21*a* is fed to an input terminal 58 of comparator 31*a* which is extended to the base of transistor 56 through a blocking capacitor 59. An input terminal 61 of the comparator circuit is connected to receive the output of bandpass filter 28*a*, which is passed through a capacitor 62 and from there to the collector of transistor 56 through a resistor 63 and to capacitor 57 through a resistor 64. The emitter of transistor 56 is connected to ground as shown. In operation, the base of transistor 56 is biased through a resistor 66 as shown, such that transistor 56 assumes a conductive state at one polarity peak of each cycle of the disturb signal from source 21a. Thus, the charge on capacitor 57 is periodically discharged through transistor 56 such that it may and does assume an average potential and polarity representative of the tracking error. The output voltage across capacitor 57 is passed to summing junction 52 over line 32*a*.

Figure 5:
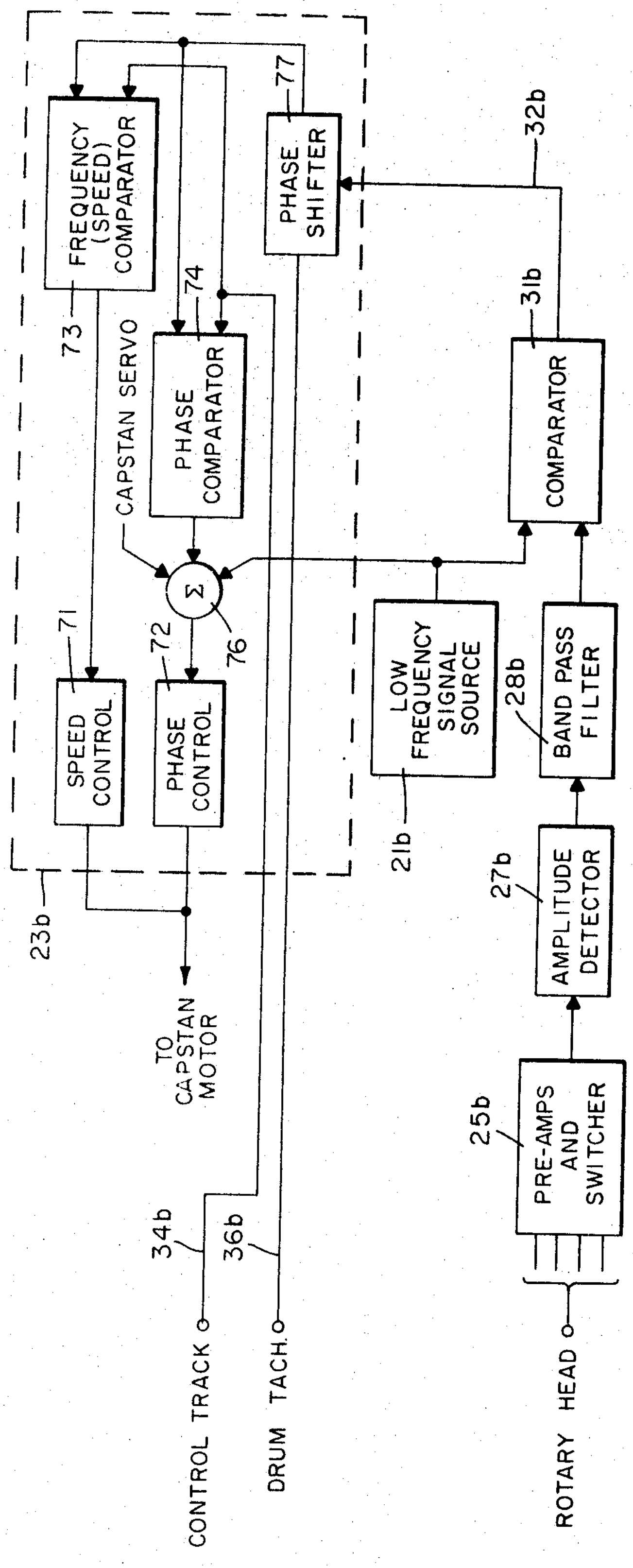
FIG. 5 is a generalized block diagram showing a preferred circuit embodiment of the present invention for use in conjunction with a transverse scan video tape transport.
Figure 6:
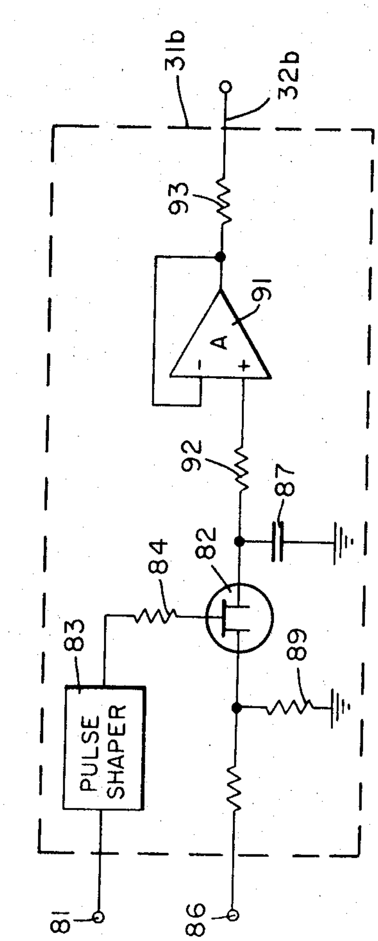
FIG. 6 is a composite schematic and block diagram showing in detail the makeup of one of the block components of the FIG. 5 circuit diagram.

A particular advantageous species of the present invention is shown by FIGS. 5 and 6 which form the subject matter of a separate application Ser. No. 25,910 filed Apr. 6, 1970 for "Automatic Tracking Circuit for Transverse Scan Magnetic Tape Transport," with respect to which I am a joint inventor with Reginald W. Oldershaw. That application has been filed concurrently with the present application and has also been assigned to the same assignee. In particular, the invention illustrated by FIGS. 5 and 6 has been found to provide rapid tracking lock-up for a transverse scan video tape record/reproduce system. Those components shown in FIG. 5 which are carried over from the generalized block diagram of FIG. 1, are denoted by the same reference numeral and the postscript "*b*". Thus, capstan servo 23*b* is responsive to the control track and drum tachometer signals received over lines 34*b* and 36*b*, and is further responsive to source 21*b* and the output of comparator 31*b*. Capstan servo 23*b* in this instance is provided with both a feedback loop speed control, indicated at 71, and a feedback loop phase control 72 which jointly control the rotational speed of capstan motor 22 and the instantaneous angular displacement thereof. Speed control 71 is in turn responsive to the output of a frequency (speed) comparator 73 which compares the frequency relationship between the control track and drum tachometer signals. Similarly, phase control 72 is responsive to the output of a phase comparator 74 which compares the phase between such signals. A summation junction 76 receives and sums the output of phase comparator 74 with the output of signal source 21*b*, the latter providing the periodic perturbation of the speed of capstan motor 22.

In order to enhance the gain stability of the automatic tracking loop, the preamplifier portion of circuit 25b may comprise automatic gain control for maintaining constant the average level of the varying RF envelope.

To provide means for correcting a tracking error detected by comparator 31*b*, the output thereof is fed over line 32*b* to a phase shifter 77 which is connected in series with the drum tachometer line 36*b*. In response to an error signal from comparator 31*b*, shifter 77 causes the phase of the drum tachometer signal to be either advanced or retarded in accordance with the polarity of the error signal. The resulting phase change of the tachometer signal causes the output of phase comparator 74 to change which in turn causes phase control 72 to correct the tracking error by advancing or retarding the speed of capstan motor 22. It will be appreciated that phase shifter 77 could alternatively be disposed in series with line 34*b* to perform the phase shift on the control track signal rather than the drum tachometer signal. However, the performance of the automatic tracking control circuit is smoother with the circuit arranged as shown, particularly during start-up of the capstan drive, due to the fact that the tachometer signal is continuous during start-up and shut down of the capstan drive while the control track signal requires continuous running of the capstan. Furthermore, during steady state playback operation the tachometer signal is continuous and not subject to drop-outs or other signal distortion which would adversely affect the circuit's performance.

With reference to FIG. 6, a schematic diagram of comparator 31*b* is shown. This comparator is somewhat more sophisticated than comparator 31*a* shown by FIG. 4, and provides a more rapid lock-up time for the tracking control. While comparator 31*a*, as described, operates to provide an average tracking error signal, comparator 31*b* develops a revised error signal upon each cycle of the signal from source 21*b*. Particularly, the output of source 21*b* is fed to an input 81 of the comparator for switching a field effect transistor 82 to a low impedance condition for a brief interval during each period of the waveform from source 21*b*. For this purpose, a pulse shaper 83 is provided which responds to each cycle of the disturb signal frequency to provide a short duration gating pulse, which when applied to the gate of transistor 82 through a resistor 84 causes the transistor to switch on for the timewidth of the applied pulse. The output of bandpass filter 28*b* is applied to the remaining input terminal 86 of comparator 31*b* as shown. When transistor 82 is switched to a low impedance condition for a brief interval during each cycle of the signal from source 21*b*, *the amplitude and polarity of the signal appearing at terminal 86 during that interval is passed to and stored on a capacitor 87. Resistors 88 and 89 serve as input and biasing impedances, respectively, for transistor 82. The instantaneous voltage and charge polarity on capacitor 87 is communicated to the output of comparator 31b* by means of a buffer amplifier 91 having an exceedingly high input impedance, yet having an output which precisely follows the input voltage thereto. Thus, during intervals in which transistor 82 is in a high impedance condition, the charge on capacitor 87 is preserved by the virtue of the high impedance input of buffer amplifier 91 and a correspondingly high output impedance of field defect transistor 82 in its nonconductive state. Resistors 92 and 93 serve as input and output impedances for amplifier 91. Thus, transistor 82 and capacitor 87 forms a sample and hold network in which the amplitude and phase of the tracking error is held on capacitor 87 and passed to line 32*b* by amplifier 91. In operation, the error signal output on line 32*b* is revised upon each full cycle of the output signal from source 21*b*. Accordingly, tracking errors are quickly corrected with little if any loss in playback signal information.

What is claimed is:

1. An automatic tracking control circuit for a transverse scan tape transport which includes a capstan drive for longitudinal translation of magnetic tape and a rotary magnetic head rotating in a path angulated with respect to said tape for reading tracks of prerecorded video information and said transport being equipped with an audio head for reading a prerecorded longitudinal audio track on said tape, wherein said circuit comprises;

an electrical signal source issuing a periodically varying electrical signal of a frequency substantially less than a lower frequency limit of said prerecorded video information and being equal to or less than low frequency limit of the audio track bandwidth, said source being connected to said capstan drive for periodically varying the translation speed of said tape;

comparator means having inputs coupled to said source and said rotary magnetic head for detecting frequency and phase correspondence of signals issued therefrom;

an amplitude detector and filter serially connected between and coupling said rotary magnetic head to an input of said comparator means, said amplitude detector having a frequency sensitivity below said lower frequency limit of said video information and said filter passing signals at the frequency of said source signal such that the signal received at said comparator from said magnetic head represents certain frequency components of the envelope of prerecorded information as modulated by the varying translation of said tape; and feedback circuit means connected between said comparator means and said capstan drive and being responsive to the frequency and phase correspondence of the signals from said source and comparator means to issue control signals to said capstan drive for adjusting the translation of said tape to maintain optimum registration between said head assembly and said prerecorded video information tracks.

2. The circuit as defined in claim 1 wherein the low frequency limit of the audio track bandwidth is 20 cycles per second and the frequency of said source signal is selected to be equal to or greater than 5 cycles per second in order to provide adequate sampling information of the tracking relationship and to be equal to or less than 20 cycles per second in order to avoid distortion of the reproduce audio signal.

3. A method of maintaining optimum playback tracking between the rotary magnetic head of a rotary transverse scan tape transport and the prerecorded transverse tracks on the tape wherein the information on said prerecorded transverse tracks has a known frequency range, and said transport includes a stationary magnetic head for reproducing a longitudinal audio frequency track on said tape, comprising:

moving the tape at a desired average translation speed and varying such speed at a frequency substantially below said known frequency range of said prerecorded transverse track information and at a frequency at or below the low frequency limit of the audio frequency and at an amplitude such that the rotary head vacilates about a center line of said transverse tracks;

detecting an amplitude modulation of the playback signal from said rotary head caused by the varying tape speed;

comparing the frequency, amplitude, and phase relationship between a signal drive from said detecting step and signal representing the varying tape speed; and adjusting the tape translation in an amount and direction dictated by said amplitude and phase relationship as provided by said comparing step to bring said tracks into optimum tracking registration with said rotary head.

* * * * *